(12) United States Patent
Miyakoshi

(10) Patent No.: US 9,454,708 B2
(45) Date of Patent: Sep. 27, 2016

(54) RECOGNITION DICTIONARY CREATION APPARATUS AND METHOD FOR CREATING RECOGNITION DICTIONARY BY THE SAME

(71) Applicant: TOSHIBA TEC KABUSHIKI KAISHA, Shinagawa-ku, Tokyo (JP)

(72) Inventor: Hidehiko Miyakoshi, Miyagi-ken (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 176 days.

(21) Appl. No.: 14/285,688

(22) Filed: May 23, 2014

(65) Prior Publication Data
US 2014/0355838 A1    Dec. 4, 2014

(30) Foreign Application Priority Data

May 28, 2013 (JP) .................................. 2013-112033

(51) Int. Cl.
| | |
|---|---|
| G06K 9/00 | (2006.01) |
| G06K 9/36 | (2006.01) |
| G06T 15/50 | (2011.01) |
| G06K 9/46 | (2006.01) |
| G06K 9/62 | (2006.01) |
| G06T 15/60 | (2006.01) |

(52) U.S. Cl.
CPC .............. G06K 9/46 (2013.01); G06K 9/6254 (2013.01); G06K 9/6255 (2013.01); G06T 15/50 (2013.01); G06K 2209/17 (2013.01)

(58) Field of Classification Search
None
See application file for complete search history.

(56) References Cited

U.S. PATENT DOCUMENTS 5,115,888 A * 5/1992 Schneider ............... A47F 9/048
                                              186/61
5,497,314 A * 3/1996 Novak .................... A47F 9/046
                                              235/383

(Continued)

FOREIGN PATENT DOCUMENTS

| JP | 08-138028 | 5/1996 |
| JP | 10-260960 | 9/1998 |

(Continued)

OTHER PUBLICATIONS

First Office Action for Japanese Patent Application No. 2013-112033 Dated May 19, 2015, 6 pages.

*Primary Examiner* — Matthew Bella
*Assistant Examiner* — Jose M Torres
(74) *Attorney, Agent, or Firm* — Amin, Turocy & Watson LLP

(57) ABSTRACT

A recognition dictionary creation apparatus photographs a commodity by an image capturing section to capture the image of the commodity; measures a distance from the image capturing section to the commodity photographed by the image capturing section; generates a quasi-commodity-image in a state in which the commodity is imaginarily moved away from the image capturing section to a given registration distance longer than the measurement distance based on the image of the commodity photographed by the image capturing section; extracts an appearance feature amount of the commodity from the generated quasi-commodity-image; and registers, in a recognition dictionary in association with the registration distance data, the extracted appearance feature amount as the feature amount data of the photographed commodity at the registration distance to create the recognition dictionary.

5 Claims, 8 Drawing Sheets

(56) References Cited

U.S. PATENT DOCUMENTS

| | | | | |
|---|---|---|---|---|
| 5,546,475 A | * | 8/1996 | Bolle | G06K 9/4647 382/110 |
| 5,883,968 A | * | 3/1999 | Welch | A47F 9/045 382/100 |
| 5,967,264 A | * | 10/1999 | Lutz | A47F 9/048 186/61 |
| 7,448,542 B1 | * | 11/2008 | Bobbitt | G06Q 20/208 186/61 |
| 8,068,674 B2 | * | 11/2011 | Goncalves | A47F 9/047 235/462.01 |
| 8,571,298 B2 | * | 10/2013 | McQueen | G06K 9/00 235/378 |
| 2002/0138374 A1 | * | 9/2002 | Jennings | G06K 9/00 705/29 |
| 2008/0154736 A1 | * | 6/2008 | Gatto | G01G 15/00 705/23 |
| 2009/0213219 A1 | * | 8/2009 | Eggert | G06T 7/2086 348/148 |
| 2010/0217678 A1 | * | 8/2010 | Goncalves | G06Q 20/203 705/22 |
| 2012/0298762 A1 | * | 11/2012 | Hasegawa | G07G 1/0045 235/494 |

FOREIGN PATENT DOCUMENTS

| | | |
|---|---|---|
| JP | 2005-065265 | 3/2005 |
| JP | 2009-156776 | 7/2009 |
| JP | 2010-237886 | 10/2010 |

* cited by examiner

FIG.3

| | SETTING DISTANCE | |
|---|---|---|
| COMMODITY ID | COMMODITY NAME | FEATURE AMOUNT DATA |
| | | |
| | | |
| ⋮ | ⋮ | ⋮ |

| COMMODITY ID | COMMODITY NAME | UNIT PRICE | SHAPE | SIZE | f |
|---|---|---|---|---|---|
| 000001 | APPLE (FUJI) | 100 | SP | M | 0 |
| 000002 | WATERMELON | 500 | SP | L | 0 |
| 000003 | LEMON | 80 | EL | S | 0 |
| 000004 | RADISH | 120 | CY | L | 1 |
| ⋮ | ⋮ | ⋮ | ⋮ | ⋮ | ⋮ |

| SHAPE / CELL DISTANCE | SIZE | | | | | |
|---|---|---|---|---|---|---|
| | S1 | S2 | ⋯ | Sn | ⋯ | Sz |
| d1 | k11 | k12 | ⋯ | k1n | ⋯ | k1z |
| d2 | k21 | k22 | ⋯ | k2n | ⋯ | k2z |
| d3 | k31 | k32 | ⋯ | k3n | ⋯ | k3z |

50

RECOGNITION DICTIONARY CREATION APPARATUS AND METHOD FOR CREATING RECOGNITION DICTIONARY BY THE SAME

CROSS-REFERENCE TO RELATED APPLICATION

This application is based upon and claims the benefit of priority from Japanese Patent Application No. 2013-112033, filed May 28, 2013, the entire contents of which are incorporated herein by reference.

FIELD

Embodiments described herein relate to a recognition dictionary creation apparatus used in a system which recognizes a commodity from an image captured by photographing the commodity and, a method for creating a recognition dictionary by the recognition dictionary creation apparatus.

BACKGROUND

There is a technology in which an object is recognized from an image of the object captured by an image capturing section. In such a technology, an appearance feature amount of the object is extracted from the image and then compared with feature amount data of each reference image registered in the recognition dictionary to calculate a similarity degree of the feature amounts. Then, an object equivalent to the reference image having the highest similarity degree is recognized as the object photographed by the image capturing section. In recent years, it has been proposed to apply such an object recognition technology to a checkout system (POS system) of a retail store to recognize commodities purchased by a customer.

BRIEF DESCRIPTION OF THE DRAWINGS

FIG. 3 is a schematic view illustrating the structure of data stored in a recognition dictionary file;

FIG. 4 is a schematic view illustrating the structure of data stored in a commodity information file;

FIG. 5 is a schematic view illustrating the structure of data stored in a correction file;

DETAILED DESCRIPTION

In accordance with one embodiment, a recognition dictionary creation apparatus comprises an image capturing section, a measurement module, a specifying module, a generation module, an after-generation extraction module and an after-generation registration module. The image capturing section photographs a commodity to capture the image of the commodity. The measurement module measures a distance from the image capturing section to the commodity photographed by the image capturing section. The specifying module specifies the commodity. The generation module generates a quasi-commodity-image in a state in which the commodity is imaginarily moved away from the image capturing section to a given registration distance longer than the distance measured by the measurement module based on the image of the commodity photographed by the image capturing section. The after-generation extraction module extracts an appearance feature amount of the commodity from the quasi-commodity-image generated by the generation module. The after-generation registration module registers, in a recognition dictionary in association with the registration distance data, the appearance feature amount extracted by the after-generation extraction module as the feature amount data of the commodity specified by the specifying module at the registration distance to create the recognition dictionary.

One embodiment of the recognition dictionary creation apparatus is described below with reference to the accompanying drawings.

In the present embodiment, a scanner device 1, which functions as a commodity recognition apparatus of a store checkout system, further includes a function as the recognition dictionary creation apparatus.

Figure 1:
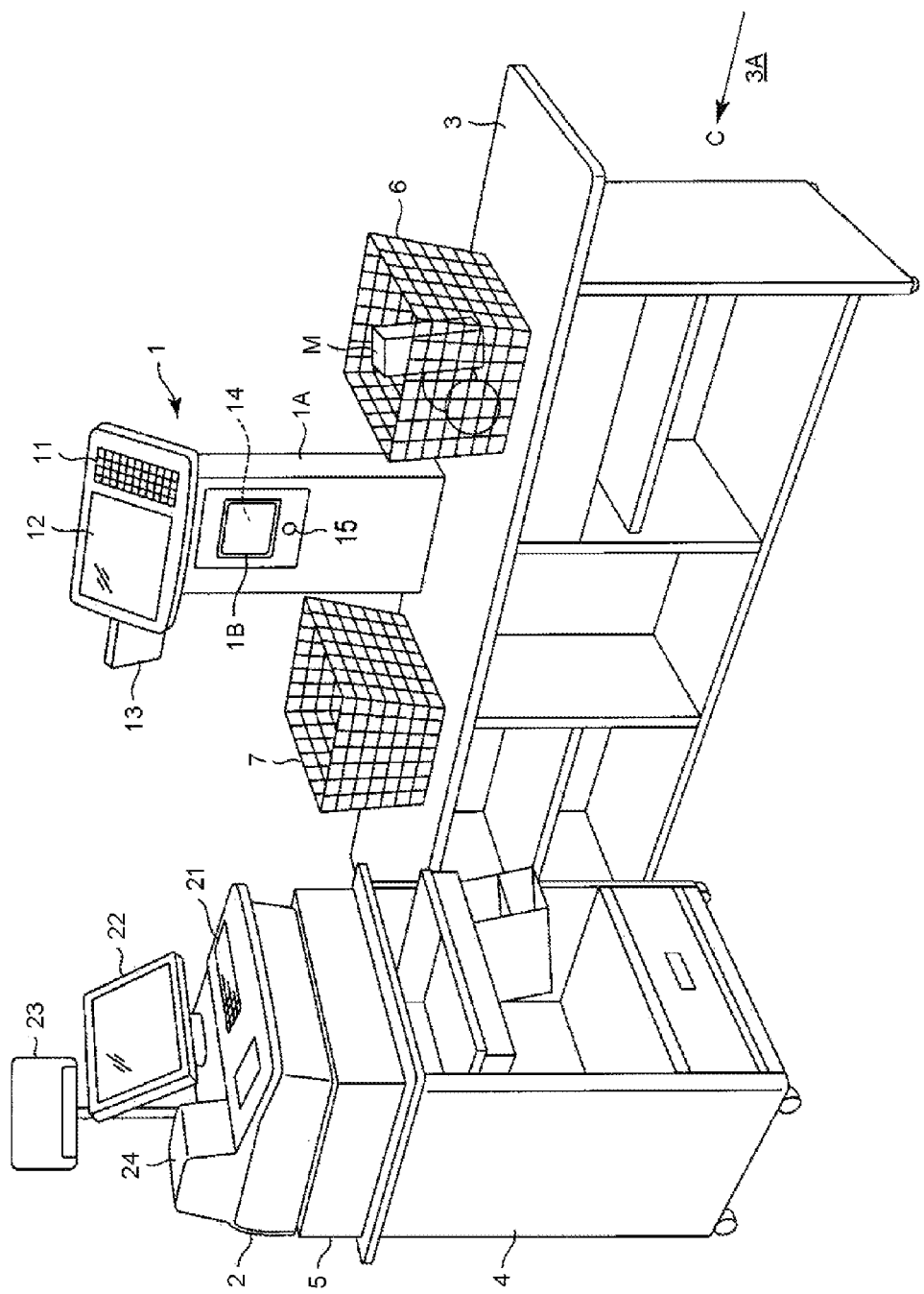
FIG. 1 is an external view of a store checkout system according to one embodiment.

FIG. 1 is an external view of the store checkout system. The system includes a scanner device 1 as a registration section for registering a commodity purchased by a customer and a POS (Point Of Sales) terminal 2 acting as a settlement section for processing the payment by the customer. The scanner device 1 is mounted on a checkout counter 3. The POS terminal 2 is arranged on a register table 4 through a drawer 5. The scanner device 1 and the POS terminal 2 are electrically connected with each other through a communication cable 8 (refer to FIG. 2).

The scanner device 1 comprises a keyboard 11, a touch panel 12 and a display for customer 13. Those display or operation devices (keyboard 11, touch panel 12 and display for customer 13) are attached to a rectangular-shaped thin housing 1A constituting a main body of the scanner device 1.

An image capturing section 14 is installed in the housing 1A. A reading window 1B is formed in a rectangular shape at the front surface of the housing 1A. The image capturing section 14 comprises a CCD (Charge Coupled Device) image capturing element as an area image sensor, a drive circuit thereof, and an image capturing lens for focusing the image of an image capturing area on the CCD image capturing element. The image capturing area refers to an area of a frame image which is focused on the area of the CCD image capturing element through the image capturing lens from the reading window 1B. The image capturing section 14 outputs the image focused on the image capturing area of the CCD image capturing element through the image capturing lens. The area image sensor, which is not limited to the CCD image capturing element, may be, for example, a CMOS (complementary metal oxide semiconductor) device.

A distance sensor 15 serving as a measurement module is arranged nearby the reading window 1B. The distance sensor 15 is used to measure a distance from the image capturing section 14 to the commodity photographed by the image capturing section 14. A well-known distance sensor such as a sensor formed by combining an infrared LED and a phototransistor or a sensor using ultrasonic or laser light may be applied as such a distance sensor 15.

The POS terminal 2 comprises a keyboard 21, a display for operator 22, a display for customer 23 and a receipt printer 24 as devices required for settlement.

The checkout counter 3 is arranged along a customer passage 3A. The register table 4 is arranged at a side opposite to the customer passage 3A with respect to the checkout counter 3 at a substantially right angle to the checkout counter 3. Specifically, the register table 4 is located at the end of the checkout counter 3 at the downstream side of the passage 3A in a movement direction of a customer indicated by an arrow C. Therefore, the checkout counter 3 and the register table 4 are arranged in an L-shape to define a space 3B for a shop clerk in charge of settlement, i.e., so called casher.

At the approximate center of the checkout counter 3, the housing 1A of the scanner device 1 is vertically arranged in such a manner that the keyboard 11, the touch panel 12 and the reading window 1B are directed to the side of the cashier (space 3B), respectively. The display for customer 13 of the scanner device 1 is arranged on the housing 1A, facing to the customer passage 3A.

A first upper surface portion of the checkout counter 3 at the upstream side thereof through the scanner device 1 in the customer movement direction serves as a space for placing a shopping basket 6 in which an unregistered commodity M purchased by a customer is held. On the other side, a second upper surface portion at the downstream side through the scanner device 1 serves as another space for placing a shopping basket 7 in which a commodity M registered by the scanner device 1 is held.

Figure 2:
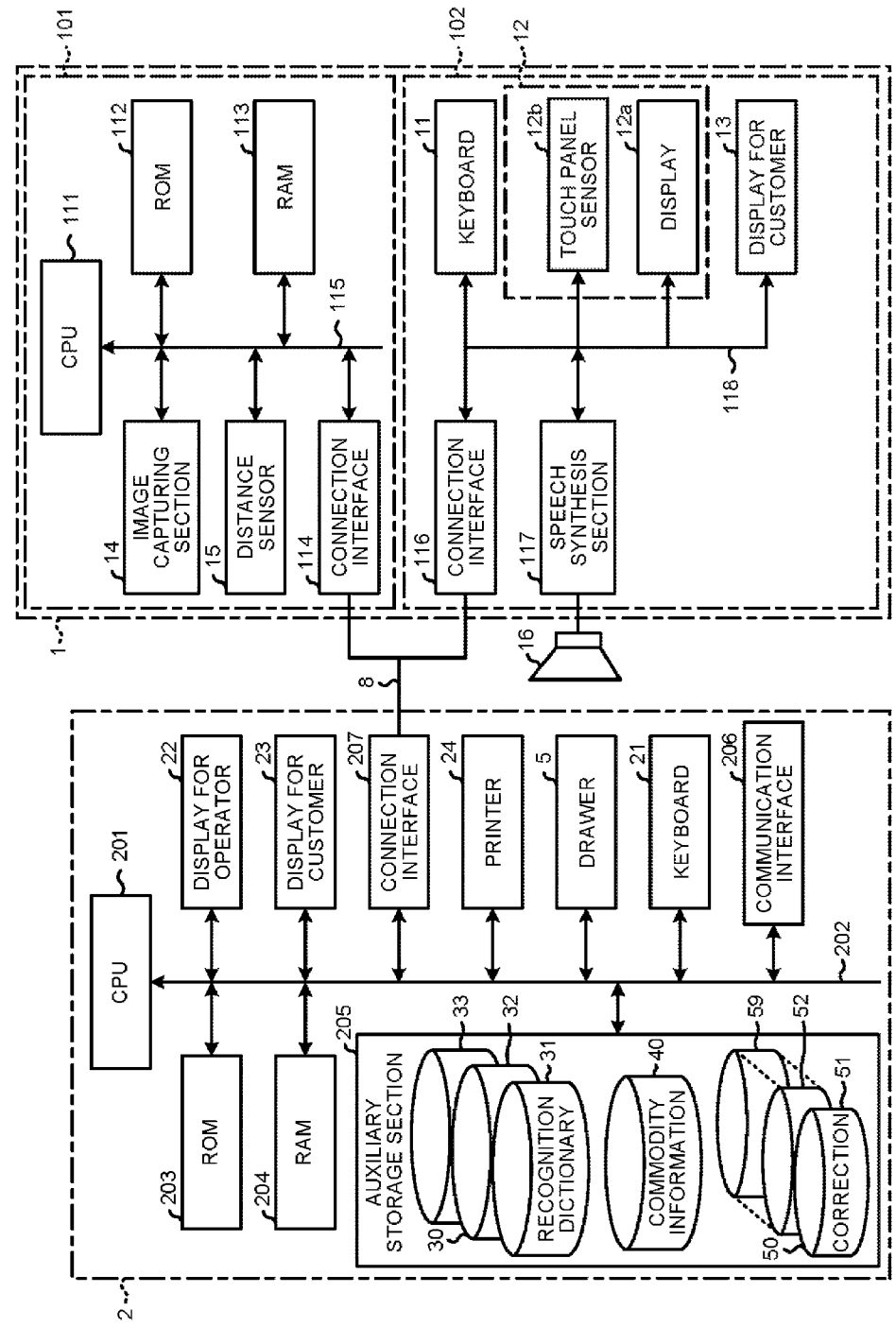
FIG. 2 is a block diagram illustrating hardware constitutions of a scanner device and a POS terminal.

FIG. 2 is a block diagram illustrating the hardware constitutions of the scanner device 1 and the POS terminal 2. The scanner device 1 comprises a scanner section 101 and an operation-output section 102. The scanner section 101 includes a CPU (Central Processing Unit) 111, a ROM (Read Only Memory) 112, a RAM (Random Access Memory) 113 and a connection interface 114. The scanner section 101 further includes the image capturing section 14 and the distance sensor 15. The CPU 111, the ROM 112, the RAM 113 and the connection interface 114 are connected with each other via a bus line 115. Further, the image capturing section 14 and the distance sensor 15 are also connected with the bus line 115 through an input/output circuit (not shown).

The CPU 111 is a central part of a computer. The CPU 111 controls each section to achieve various functions of the scanner device 1 according to an operating system or an application program.

The ROM 112 is a main storage part of the computer. The ROM 112 stores the operating system and the application program mentioned above. As occasion demands, ROM 112 also stores data required to execute various processing by the CPU 111. The application program includes a recognition dictionary creation program and a commodity recognition program described later.

The RAM 113 is also a main storage part of the computer mentioned above. The RAM 113 stores data required to execute various processing by the CPU 111 as needed. Further, the RAM 113 is also used as a work area for the CPU 111 when various processing is executed.

The operation-output section 102 includes the keyboard 11, the touch panel 12, the display for customer 13, a connection interface 116, and a speech synthesis section 117. The keyboard 11, the touch panel 12 and the display for customer 13 are respectively connected with a bus line 118 through an input/output circuit (not shown). The connection interface 116 and the speech synthesis section 117 are also connected with the bus line 118.

The touch panel 12 comprises a panel type display 12a and a touch panel sensor 12b overlaid on the screen of the display 12a.

The speech synthesis section 117 outputs a speech or voice signal to a speaker 16 in response to a command input via the bus line 118. The speaker 16 converts the voice signal into a voice to output it.

The POS terminal 2 also carries a CPU 201 as a main body of a control section. The CPU 201 is connected with a ROM 203, a RAM 204, an auxiliary storage section 205, a communication interface 206 and a connection interface 207 via a bus line 202. In addition, the keyboard 21, display for operator 22, display for customer 23, printer 24 and drawer 5 are respectively connected with the bus line 202 via an input-output circuit (not shown).

The communication interface 206 is connected with a store server (not shown) via a network such as a LAN (Local Area Network) and the like. Through this connection, the POS terminal 2 can perform a transmission/reception of data with the store server.

The connection interface 207 is connected with the two connection interfaces 114 and 116 of the scanner device 1 via the communication cable 8. Through the connection, the POS terminal 2 receives information from the scanner section 101 of the scanner device 1. In addition, the POS terminal 2 performs a transmission/reception of data signals with the keyboard 11, the touch panel 12, the display for customer 13 and the speech synthesis section 117 which constitute the operation-output section 102 of the scanner device 1. On the other hand, the scanner device 1 can access the data file stored in the auxiliary storage section 205 of the POS terminal 2 through this connection.

The auxiliary storage section 205, which is, for example, a HDD (Hard Disk Drive) device or a SSD (Solid State Drive) device, further stores data files such as a recognition dictionary file 30, a commodity information file 40, a correction file 50 and the like, in addition to various programs. In the present embodiment, the recognition dictionary file 30 includes three kinds of files, i.e., a short-distance recognition dictionary file 31, an intermediate-distance recognition dictionary file 32 and a long-distance recognition dictionary file 33. The correction file 50 includes nine kinds of files, i.e., a small-size sphere correction file 51, a medium-size sphere correction file 52, a large-size sphere correction file 53, a small-size ellipsoid correction file 54, a medium-size ellipsoid correction file 55, a large-size ellipsoid correction file 56, a small-size cylinder correction file 57, a medium-size cylinder correction file 58 and a large-size cylinder correction file 59. Besides, the large-size sphere correction file 53, the small-size ellipsoid correction file 54, the medium-size ellipsoid correction file 55, the large-size ellipsoid correction file 56, the small-size cylinder correction file 57 and the medium-size cylinder correction file 58 are not shown in the figures.

FIG. 3 is a schematic view illustrating the structure of the data stored in the recognition dictionary file 30. As shown in FIG. 3, setting distances are respectively stored in the recognition dictionary file 30 (31, 32, 33) in advance. For example, a "5 cm" is stored in the short-distance recognition dictionary file 31 as the setting distance d1, a "15 cm" is stored in the intermediate-distance recognition dictionary file 32 as the setting distance d2, and a "30 cm" is stored in the long-distance recognition dictionary file 33 as the setting distance d3.

Further, a plurality of recognition dictionary records including a commodity ID, commodity name and feature amount data are stored in each recognition dictionary file 31, 32, 33. The commodity ID is a unique code for distinguishing each commodity individually. The commodity name is the name of the commodity specified with the corresponding commodity ID. The feature amount data is obtained by extracting appearance feature amount serving as surface information (appearance shape, hue, pattern, concave-convex state and the like) of a commodity, which is distinguished with the corresponding commodity ID, from a reference image captured by photographing the commodity at a corresponding setting distance d1, d2 or d3 away from the image capturing section 14, and then representing the extracted appearance feature amount in the form of parameters.

The distance from the image capturing section 14 indicates a separation distance from the reading window 1B. The distance from the image capturing section 14 is 0 cm if the commodity is contacted with the reading window 1B. The distance from the image capturing section 14 increases as the commodity is moved away from the reading window 1B.

FIG. 4 is a schematic view illustrating the structure of the data stored in the commodity information file 40. As shown in FIG. 4, a plurality of commodity information records including the commodity ID, commodity name, unit price, shape code, size code, registration flag f are stored in the commodity information file 40. The commodity ID is a unique code for distinguishing each commodity individually. The commodity name and the unit price respectively refer to the name and the sales price per unit of the commodity specified with the corresponding commodity ID.

The shape code indicates the classification based on the appearance shape of the commodity specified with the corresponding commodity ID. In the present embodiment, shape of each commodity is classified into three types, i.e., "sphere", "ellipsoid" and "cylinder". For example, apple, watermelon, melon and the like belong to "sphere"; lemon, cabbage and the like belong to "ellipsoid"; and radish, carrot, burdock and the like belong to "cylinder". It is defined that the shape code of the "sphere" shape is "SP", the shape code of the "ellipsoid" shape is "EL" and the shape code of the "cylinder" shape is "CY".

The size code indicates the classification based on the size of the commodity specified with the corresponding commodity ID. In the present embodiment, size of each commodity is classified into three types, i.e., "large", "medium" and "small". For example, watermelon, radish, cabbage and the like belong to "large"; apple, melon, carrot, burdock and the like belong to "medium"; and lemon and the like belong to "small". It is defined that the size code of the "large" size is "L", the size code of the "medium" size is "M" and the size code of the "small" size is "S".

The registration flag f is used to identify whether or not the feature amount data of the commodity specified with the corresponding commodity ID is registered in the recognition dictionary file 30. In the present embodiment, if the feature amount data is not registered in the recognition dictionary file 30, the registration flag f is reset to "0". If the feature amount data is registered in the recognition dictionary file 30, the registration flag f is set to "1".

FIG. 5 is a schematic view illustrating the structure of the data stored in the correction file 50. As shown in FIG. 5, the shape code and the size code are stored in the correction file 50 (51-59) in advance. The shape code "SP" and the size code "S" are stored in the small-size sphere correction file 51, the shape code "SP" and the size code "M" are stored in the medium-size sphere correction file 52, and the shape code "SP" and the size code "L" are stored in the large-size sphere correction file 53. The shape code "EL" and the size code "S" are stored in the small-size ellipsoid correction file 54, the shape code "EL" and the size code "M" are stored in the medium-size ellipsoid correction file 55, and the shape code "EL" and the size code "L" are stored in the large-size ellipsoid correction file 56. The shape code "CY" and the size code "S" are stored in the small-size cylinder correction file 57, the shape code "CY" and the size code "M" are stored in the medium-size cylinder correction file 58, and the shape code "CY" and the size code "L" are stored in the large-size cylinder correction file 59.

Further, in the correction file 50, correction coefficients kij ($1 \leq i \leq 3$, $1 \leq j \leq z$) are set for each cell code $S_1 \sim S_z$ in association with each setting distance d1, d2 and d3 (d1<d2<d3) of the short-distance recognition dictionary file 31, the intermediate-distance recognition dictionary file 32 and the long-distance recognition dictionary file 33.

Hereinafter, the cell codes $S_1 \sim S_z$ and the correction coefficient kij are described in detail with reference to FIG. 6~FIG. 8.

Figure 6:
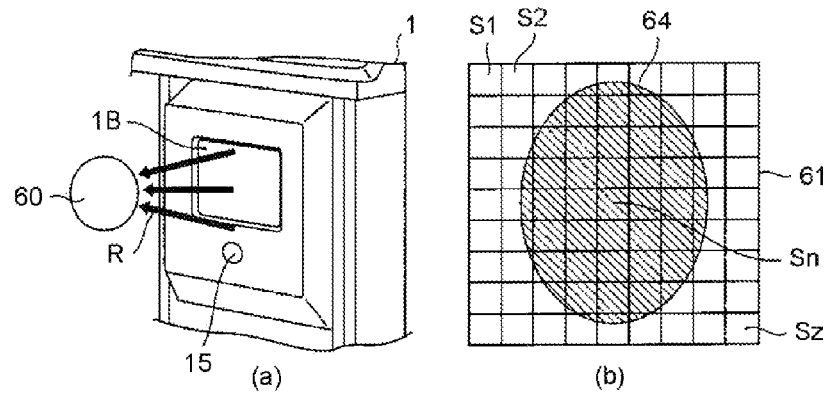
FIG. 6 is a diagram illustrating a first state in which an object is held to the scanner device at a setting distance d1 and an example of an image captured in the first state.

FIG. 6 (a) illustrates a first state in which an object 60 having a standard figure of a medium-size ellipsoid is held apart from the reading window 1B of the scanner device 1 by the setting distance d1 of the short-distance recognition dictionary file 31. FIG. 6 (b) illustrates one frame (frame image 61) of an image captured by the image capturing section 14 in the first state shown in FIG. 6 (a). FIG. 7 (a) illustrates a second state in which the same object 60 is held apart from the reading window 1B of the scanner device 1 by the setting distance d2 of the intermediate-distance recognition dictionary file 32. FIG. 7 (b) illustrates one frame (frame image 62) of an image captured by the image capturing section 14 in the second state shown in FIG. 7 (a). FIG. 8 (a) illustrates a third state in which the same object 60 is held apart from the reading window 1B of the scanner device 1 by the setting distance d3 of the long-distance recognition dictionary file 33. FIG. 8 (b) illustrates one frame (frame image 63) of an image captured by the image capturing section 14 in the third state shown in FIG. 8 (a).

It can be known by comparing each frame image 61, 62 and 63 that images 64, 65 and 66 of the object 60 respectively imaged in the frame images 61, 62 and 63 are proportional to the distances from the reading window 1B to the object 60. The images 64, 65 and 66 of the object 60 are reduced as the distance from the reading window 1B to the object 60 increases. Thus, the image 65 of the object 60 imaged in the frame image 62 can be obtained by reducing the image 64 of the object 60 imaged in the frame image 61 at a reduction ratio equivalent to a distance difference (d2–d1). Similarly, the image 66 of the object 60 imaged in the frame image 63 can be obtained by reducing the image 64 of the object 60 imaged in the frame image 61 at a reduction ratio equivalent to a distance difference (d3−d1).

However, generally, the illumination light emitted from an illumination light source installed in the image capturing section 14 of the scanner device 1 is not a surface emission. In FIGS. 6(a), 7 (a) and 8(a), arrows R schematically indicates the illumination light emitted from the illumination light source. As shown in the figures, for example, the light from the position above the reading window 1B is emitted obliquely downward, and the light from the position below the reading window 1B is emitted obliquely upward; in this way, the illumination light is emitted to the object 60 with an inclination. Thus, the amount of the light emitted to the object 60 decreases as the object 60 is moved away from the reading window 1B. Though the light reflected from the surface of the object 60 facing the reading window 1B is attenuated as the object 60 is moved away from the reading window 1B, the attenuation degree is not simply inversely proportional to the square of the distance because the light source is not a surface emission type. Further, the attenuation degree of the reflected light at the central part of the surface of the object 60 facing the reading window 1B is different from that at the outer peripheral part.

In view of the foregoing, the images 65 and 66 approximate to the image actually captured can be obtained by carrying out a correction according to the attenuation degree of the reflected light, in addition to the processing of reducing the image 64 of the object 60 imaged in the frame image 61 at a reduction ratio equivalent to the distance. The correction coefficient kij is a parameter for correcting the images 65 and 66, which are obtained by reducing the image 64 of the object 60 at a reduction ratio equivalent to the distance, according to the attenuation degree of the reflected light corresponding to the distance.

To obtain such a correction coefficient kij, in the present embodiment, the object 60 having a standard figure is prepared for each combination of the commodity shape (sphere, ellipsoid and cylinder) and the commodity size (large, medium and small). The standard figure is a typical one within the shapes and sizes of commodities belonging to the combination of shape and size applied. In addition, it is preferable that the surface color of the object 60 is white.

Figure 7:
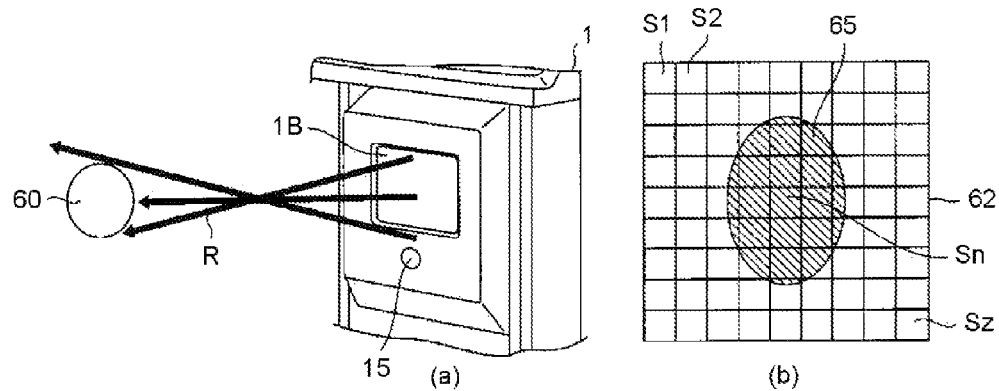
FIG. 7 is a diagram illustrating a second state in which an object is held to the scanner device at a setting distance d2 and an example of an image captured in the second state.
Figure 8:
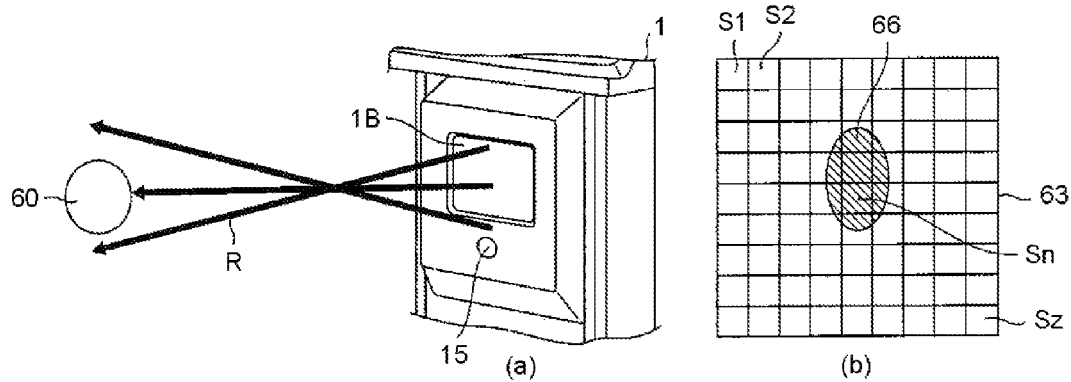
FIG. 8 is a diagram illustrating a third state in which an object is held to the scanner device at a setting distance d3 and an example of an image captured in the third state.

The creation apparatus for the correction file 50 respectively acquires, for each object 60, the frame image 61 captured in the first state shown in FIG. 6 (a), the frame image 62 captured in the second state shown in FIG. 7 (a) and the frame image 63 captured in the third state shown in FIG. 8 (a). Then, as shown in each of FIGS. 6(b), 7(b) and 8(b), the creation apparatus divides each frame image 61, 62 and 63 into a matrix form with cells of the same size. Each cell is assigned with a cell code S1, S2 . . . Sn . . . Sz in order.

The creation apparatus calculates the amount of the reflected light for each cell at the same position assigned with the same cell code S1, S2 . . . Sn . . . Sz of each frame image 61, 62 and 63, to digitize the attenuation degree thereof. Then the creation apparatus regards the resulting value as the correction coefficient k1j. For example, as to the cell having the cell code S1, the creation apparatus calculates a value equivalent to the amount of the reflected light of the frame image 62 and a value equivalent to the amount of the reflected light of the frame image 63 in a case in which the amount of the reflected light of the frame image 61 is normalized to "1". In this case, "1" is the correction coefficient k11, the value equivalent to the amount of the reflected light of the frame image 62 is the correction coefficient k21, and the value equivalent to the amount of the reflected light of the frame image 63 is the correction coefficient k31. As to the cells having the cell codes S2~Sz also, the creation apparatus calculates the same values to obtain the correction coefficient kij.

The correction coefficients k11, k12 . . . k1n . . . k1z are calculated from the frame image 61 corresponding to the setting distance d1. The correction coefficients k21, k22 . . . k2n . . . k2z are also calculated from the frame image 62 corresponding to the setting distance d2. The correction coefficients k31, k32 . . . k3n . . . k3z are still also calculated from the frame image 63 corresponding to the setting distance d3.

In a case in which the object 60 is of a standard figure of "sphere" and "small", the creation apparatus sets, in the small-size sphere correction file 51, the correction coefficients k11, k12 . . . k1n . . . k1z, the correction coefficients k21, k22 . . . k2n . . . k2z and the correction coefficients k31, k32 . . . k3n . . . k3z for each setting distance d1, d2 and d3. In this way, the small-size sphere correction file 51 is created.

In a case in which the object 60 is of a standard figure of "sphere" and "medium", the creation apparatus sets the same correction coefficients kij in the medium-size sphere correction file 52. In this way, the medium-size sphere correction file 52 is created. The large-size sphere correction file 53, the small-size ellipsoid correction file 54, the medium-size ellipsoid correction file 55, the large-size ellipsoid correction file 56, the small-size cylinder correction file 57, the medium-size cylinder correction file 58 and the large-size cylinder correction file 59 are also created in the same way.

The correction coefficient kij changes due to, for example, not only the characteristic (performance) of the image capturing section 14 of the scanner device 1 but also the light surrounding the arrangement location of the scanner device 1. Thus, when introducing the scanner device 1, a user needs to create an optimal correction file 50 for the scanner device 1 and download the file to the POS terminal 2 connected with the scanner device 1. The creation apparatus for the correction file 50 described above may be realized through a general computer by creating a proper application program.

Figure 9:
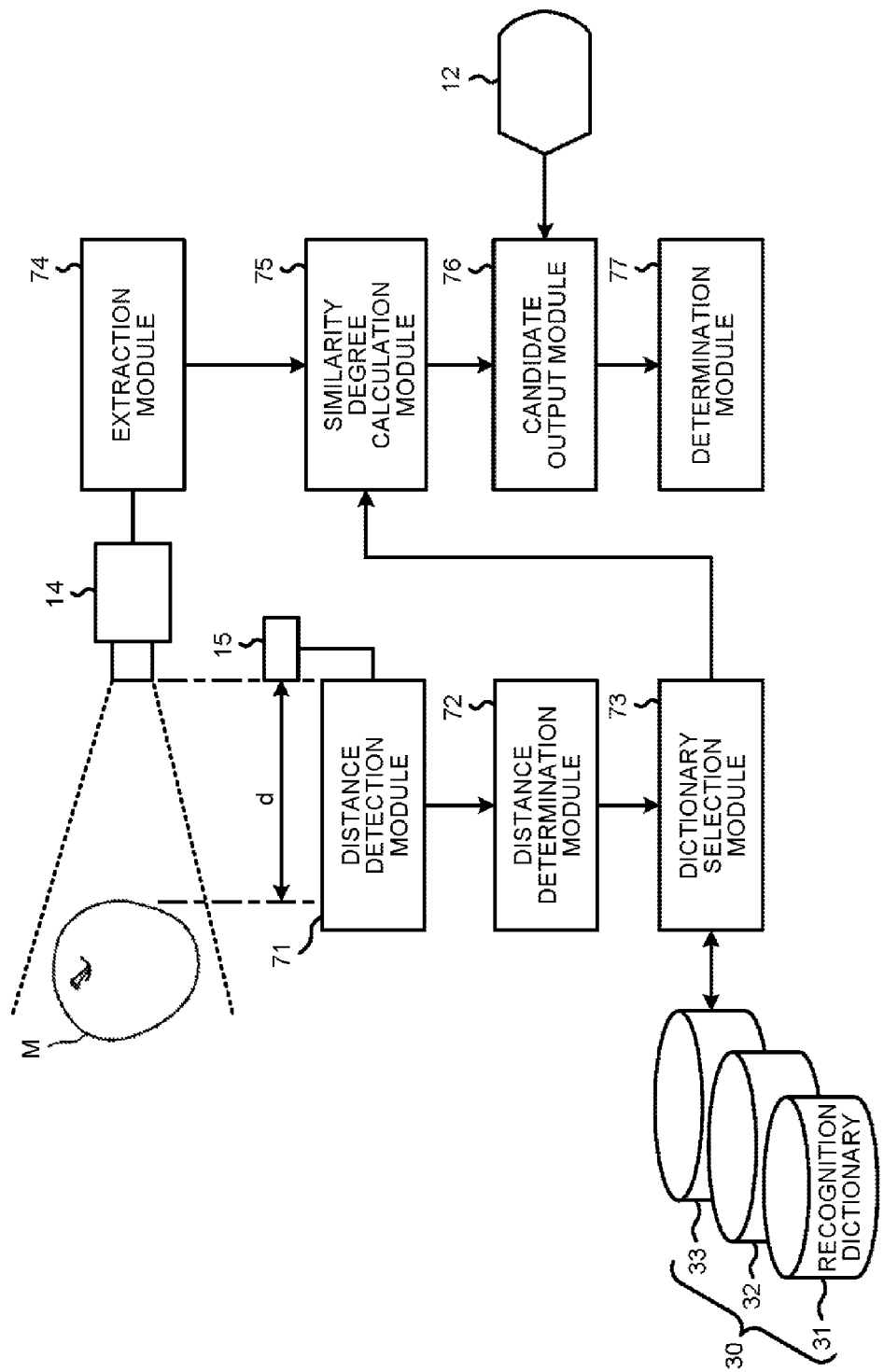
FIG. 9 is a block diagram illustrating functional components of the scanner device when operating as a commodity recognition apparatus.

FIG. 9 is a block diagram illustrating the functional components of the scanner device 1 when operating as the commodity recognition apparatus. In a case of recognizing a commodity M purchased by a customer with the scanner device 1, the user operates the keyboard 11 or the touch panel 12 to select a commodity recognition mode. Then the operator holds the commodity M to the reading window 1B.

When the commodity recognition mode is selected, the commodity recognition program is started in the scanner device 1. Then the CPU 111 realizes, according to the commodity recognition program, the functions as a distance detection module 71, a distance determination module 72, a dictionary selection module 73, an extraction module 74, a similarity degree calculation module 75, a candidate output module 76 and a determination module 77. Hereinafter, each of these functions is described in detail.

When the commodity M is held to the reading window 1B, the CPU 111 functions as the distance detection module 71. The CPU 111 acquires the distance data output from the distance sensor 15 as a measurement distance d from the image capturing section 14 to the commodity M. If the measurement distance d is acquired, the CPU 111 functions as the distance determination module 72. The CPU 111 determines which one of the setting distances d1, d2 and d3 set in the recognition dictionary file 30 is similar to the measurement distance d.

When one of the setting distances d1, d2 and d3 similar to the measurement distance d is specified, the CPU 111 functions as the dictionary selection module 73. The CPU 111 selects a recognition dictionary file 30 corresponding to the setting distance specified to be similar to the measurement distance d. For example, if the setting distance d1 is specified, the CPU 111 selects the short-distance recognition dictionary file 31. If the setting distance d2 is specified, the CPU 111 selects the intermediate-distance recognition dictionary file 32. If the setting distance d3 is specified, the CPU 111 selects the long-distance recognition dictionary file 33.

Further, when the commodity M is held to the reading window 1B, the CPU 111 functions as the extraction module 74. The CPU 111 extracts, from an image captured by the image capturing section 14, the appearance feature amount such as the shape, surface hue, pattern, concave-convex state and the like of the commodity M imaged in the image. When the appearance feature amount is extracted, the CPU 111 functions as the similarity degree calculation module 75. The CPU 111 compares the appearance feature amount extracted by the extraction module 74 with each of the feature amount data for each commodity in the recognition dictionary file 30 selected by the dictionary selection module 73 in sequence, to calculate, for each commodity registered in the dictionary, a similarity degree indicating how much similar the appearance feature amount is to the feature amount data.

When the similarity degree of each commodity is calculated, the CPU 111 functions as the candidate output module 76. The CPU 111 outputs and displays, for example, the first five commodities in the descending order of similarity degree on the touch panel 12 as the recognition commodity candidates in a selectable manner. When the recognition commodity candidates are displayed, the CPU 111 functions as the determination module 77. The CPU 111 determines the commodity selected from the recognition commodity candidates as the commodity purchased by the customer through an input operation on the keyboard 11 or the touch panel 12. Alternatively, the CPU 111 determines the commodity having the highest similarity degree within the recognition commodity candidates as the commodity purchased by the customer.

The sales data of the determined commodity is sent to the POS terminal 2 via the communication cable 8. In this way, the sales data of the commodity determined by the determination module 77 is registered in the POS terminal 2.

Figure 10:
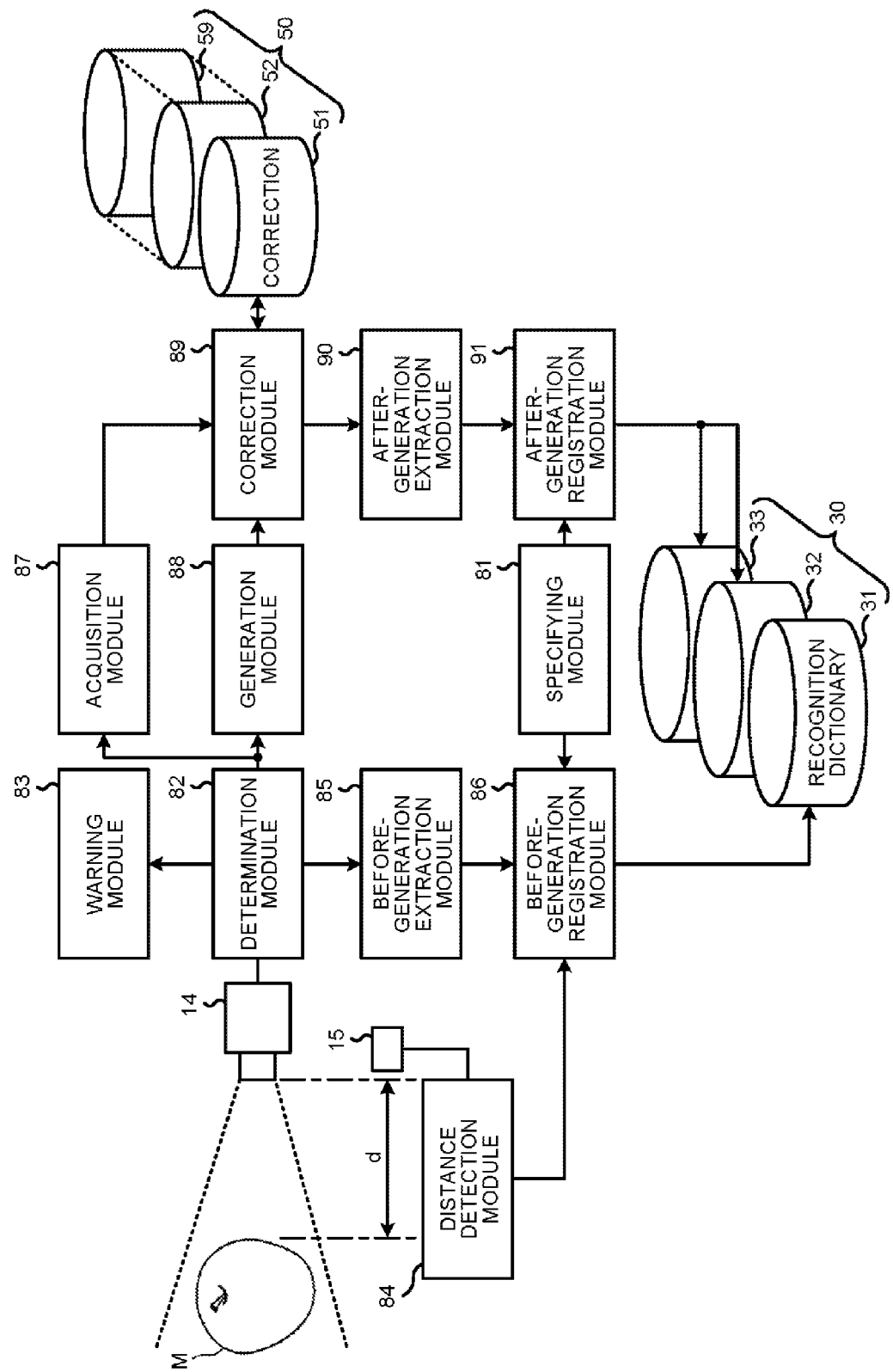
FIG. 10 is a block diagram illustrating functional components of the scanner device when operating as a recognition dictionary creation apparatus.

FIG. 10 is a block diagram illustrating the functional components of the scanner device 1 in a case in which the scanner device 1 operates as the recognition dictionary creation apparatus. In a case of registering the recognition dictionary record of the commodity M in the recognition dictionary file 30, the user operates the keyboard 11 or the touch panel 12 to select a recognition dictionary creation mode.

Figure 11:
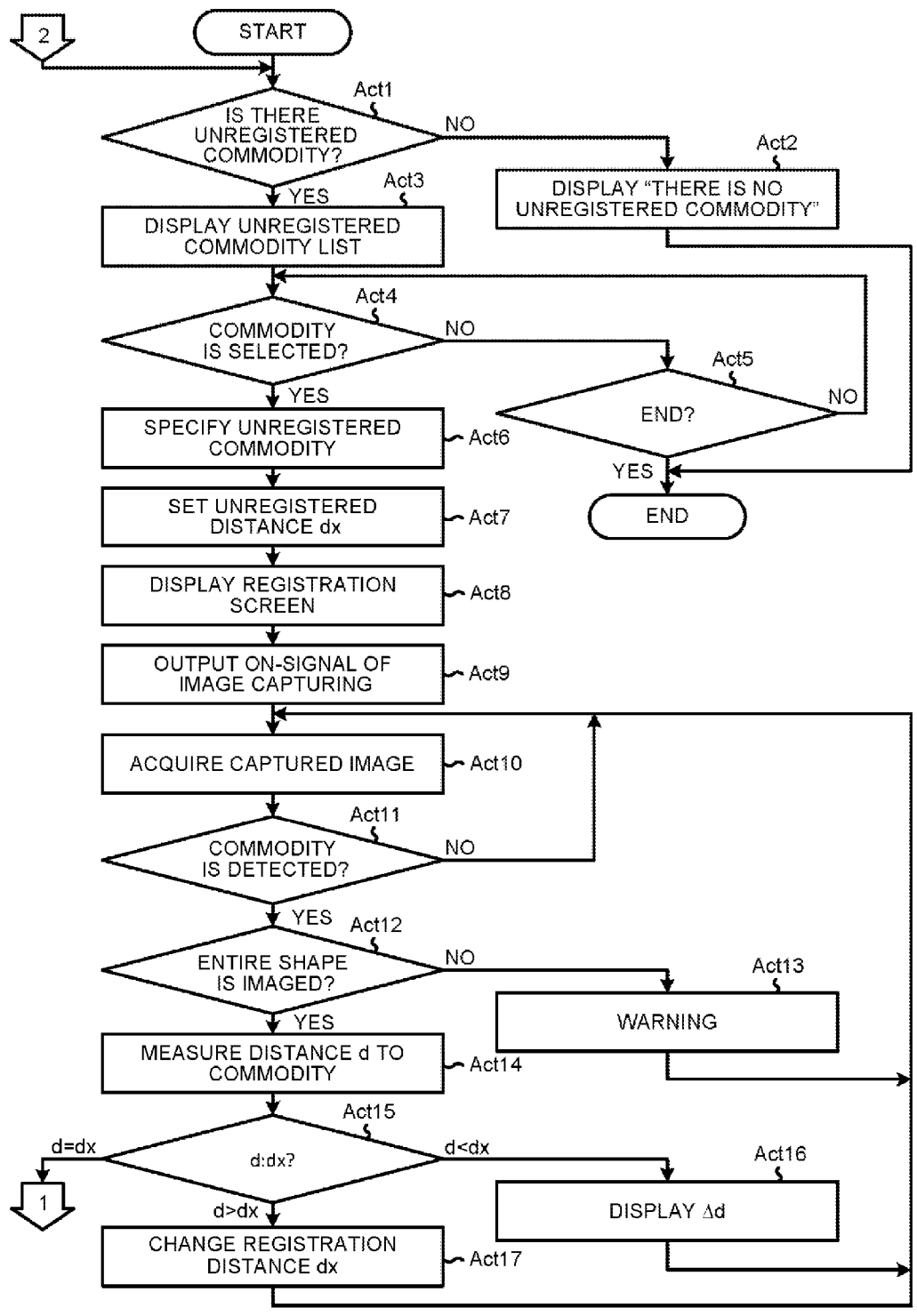
FIG. 11 is a flowchart illustrating the procedure of an information processing executed by a CPU of the scanner device according to a recognition dictionary creation program.
Figure 12:
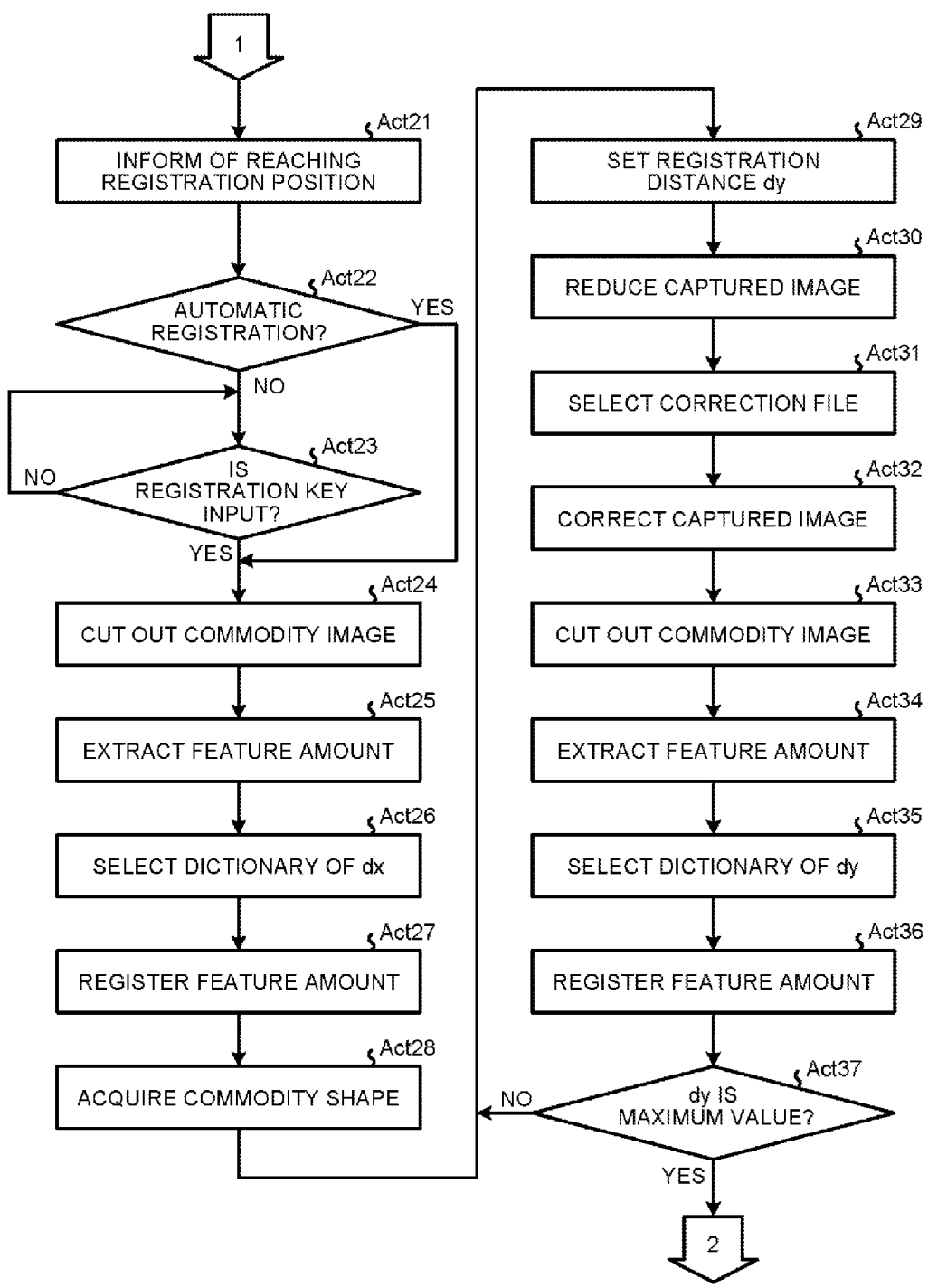
FIG. 12 is a flowchart illustrating the procedure of the information processing executed by the CPU of the scanner device according to the recognition dictionary creation program.

When the recognition dictionary creation mode is selected, the recognition dictionary creation program is started in the scanner device 1. Then the CPU 111 realizes, according to the recognition dictionary creation program, the functions as a specifying module 81, a determination module 82, a warning module 83, a distance detection module 84, a before-generation extraction module 85, a before-generation registration module 86, an acquisition module 87, a generation module 88, a correction module 89, an after-generation extraction module 90 and an after-generation registration module 91. Hereinafter, each function is described in detail with reference to the flowcharts in FIG. 11 and FIG. 12. In addition, the content of the processing described below and shown in FIG. 11 and FIG. 12 are described as one example, and the same result can be obtained by carrying out various processing properly.

When the recognition dictionary creation program is started, the CPU 111 retrieves the commodity information file 40. Then the CPU 111 confirms whether or not there is a commodity information record of which the registration flag f is reset to "0" (ACT 1). If the registration flags f of all the commodity information records are set to "1" (NO in ACT 1), there is no commodity of which the feature amount data has to be registered in the recognition dictionary file 30. In this case, the CPU 111 notifies the user that there is no commodity not yet registered (ACT 2), and then the processing is ended. The notification can be given through the display on the touch panel 12 or a sound output from the speaker 16.

On the other hand, if there is a commodity information record of which the registration flag f is reset to "0" (YES in ACT 1), the CPU 111 creates an unregistered commodity list in which the commodity name of the commodity information record of which the registration flag f is reset to "0" is listed, and then displays the unregistered commodity list on the touch panel 12 (ACT 3).

The commodity name of the unregistered commodity list can be selected through a touch operation on the touch panel 12. Further, an "end" button is also displayed on the screen of the unregistered commodity list. The CPU 111 waits for until the commodity name is selected or the "end" button is touched (ACT 4, ACT 5).

The user selects a registration target commodity M from the commodities displayed in the unregistered commodity list, and then touches the commodity name of the commodity. Then, the user holds the registration target commodity M to the reading window 1B.

If the registration target commodity M is selected (YES in ACT 4), the CPU 111 functions as the specifying module 81. The specifying module 81 specifies the commodity photographed by the image capturing section 14. The CPU 111 specifies the commodity corresponding to the touched commodity name as the registration target commodity M, and acquires the commodity information record containing the commodity name from the commodity information file 40 to store the commodity information record in the RAM 113 (ACT 6).

When the registration target commodity M is specified, the CPU 111 sets the shortest setting distance di (d1 in the present embodiment) within the setting distances d1, d2 and d3 set in the recognition dictionary file 30 as the registration distance dx (ACT 7). Then, the CPU 111 displays a registration screen on the touch panel 12 (ACT 8). An area in which the image captured by the image capturing section 14 is displayed is formed on the registration screen. A guidance which instructs the user to hold the commodity M to the image capturing section is displayed nearby the area. At this time, the content of the guidance may be informed with a sound or voice from the speaker 16.

When the registration screen is displayed, the CPU 111 outputs an ON-signal of image capturing to the image capturing section 14 (ACT 9). The image capturing section 14 starts the image capturing operation to photograph the image capturing area in response to the ON-signal of image capturing. The frame images of the image capturing area captured by the image capturing section 14 are stored in the RAM 113 in sequence.

After outputting the ON-signal of image capturing, the CPU 111 acquires the frame image stored in the RAM 113

(ACT 10). Then the CPU 111 confirms whether or not the commodity M is photographed in the frame image (ACT 11). If the commodity M is not photographed in the frame image (NO in ACT 11), the CPU 111 acquires a next frame image from the RAM 113 (ACT 10). Then the CPU 111 confirms whether or not the commodity M is photographed in the frame image (ACT 11).

If the commodity M is photographed in the frame image (YES in ACT 11), the CPU 111 functions as the determination module 82. The determination module 82 determines whether or not the entire shape of the commodity is imaged in the image captured by the image capturing section 14. The CPU 111 extracts a contour line and the like from the binary image of the frame image. Then the CPU 111 tries to extract the contour of the object imaged in the frame image. If the contour of the object is extracted completely, the CPU 111 regards that the entire shape of the commodity M is imaged in the frame image (ACT 12).

If the entire shape of the commodity M is not completely imaged in the frame image (NO in ACT 12), the CPU 111 functions as the warning module 83. The warning module 83 issues a warning if the entire shape of the commodity is not completely imaged in the image captured by the image capturing section 14. The CPU 111 displays a warning message on the registration screen to notify the user that the entire shape of the commodity is not completely imaged (ACT 13). At this time, same warning message may be issued with a sound or voice from the speaker 16.

After the warning is issued, the CPU 111 acquires a next frame image from the RAM 113 (ACT 10). Then the CPU 111 confirms whether or not the entire shape of the commodity M is completely imaged in the frame image (ACT 11, ACT 12).

If the entire shape of the commodity M is completely imaged in the frame image (YES in ACT 12), the CPU 111 functions as the distance detection module 84. The distance detection module 84 acquires the distance from the image capturing section 14 to the commodity M photographed by the image capturing section 14. The CPU 111 acquires the distance data output from the distance sensor 15 as the measurement distance d from the image capturing section 14 to the commodity M (ACT 14).

After the measurement distance d is acquired, the CPU 111 compares the measurement distance d with the registration distance dx (ACT 15). As a result, if the measurement distance d is shorter than the registration distance dx ("d<dx" in ACT 15), the CPU 111 calculates a movement distance Ad (Ad=dx-d) of the commodity M indicating the distance for which the commodity M is moved so that the measurement distance d is consistent with the given registration distance dx. Then the CPU 111 displays the movement distance Ad on the registration screen (ACT 16). After that, the CPU 111 acquires a next frame image from the RAM 113 (ACT 10) to execute the processing following ACT 11.

On the contrary, if the measurement distance d is longer than the registration distance dx ("d>dx" in ACT 15), the entire shape of the commodity M cannot be photographed in a state in which the commodity M is held to the image capturing section 14 apart from the image capturing section 14 by the registration distance dx. In this case, the CPU 111 changes the registration distance dx to the next shortest setting distance d(i+1) within the setting distances d1, d2 and d3 set in the recognition dictionary file 30 (ACT 17). After that, the CPU 111 acquires a next frame image from the RAM 113 (ACT 10) to execute the processing following ACT 11.

In addition, though it is not shown in the figures, in the processing in ACT 17, it is determined as an error that the commodity M cannot be recognized if the registration distance dx is the longest one within the setting distances d1, d2 and d3.

If the measurement distance d is consistent with the registration distance dx ("d=dx" in ACT 15), the CPU 111 displays a message on the registration screen to inform that the measurement distance d reaches the given registration distance dx (ACT 21). At this time, same message may be issued through a sound or voice from the speaker 16.

The CPU 111 determines whether or not an automatic registration mode is set (ACT 22). The scanner device 1 has an automatic registration mode and a manual registration mode in a case in which the scanner device 1 operates as a recognition dictionary creation apparatus, and one of the automatic registration mode and the manual registration mode is set as a default mode in advance. The operation mode can be properly changed by the user.

If the automatic registration mode is set (YES in ACT 22), the CPU 111 functions as the before-generation extraction module 85. On the contrary, if the manual registration mode is set (NO in ACT 22), the CPU 111 waits for until a registration key is input (ACT 23). The registration key is arranged on the keyboard 11. Alternatively, the registration key may be displayed on the registration screen only in the manual registration mode. If the registration key is input (YES in ACT 23), the CPU 111 functions as the before-generation extraction module 85.

The before-generation extraction module 85 extracts the appearance feature amount of the commodity M from the image of the commodity M photographed by the image capturing section 14. The CPU 111 cuts out the commodity image from the frame image in which the commodity M is detected in the processing in ACT 11 (ACT 24). Then the CPU 111 extracts the appearance feature amount such as the shape, surface hue, pattern, concave-convex state and the like of the commodity M from the commodity image (ACT 25).

If the appearance feature amount of the commodity M is extracted, the CPU 111 functions as the before-generation registration module 86. The before-generation registration module 86 registers, in the recognition dictionary file 30 in association with the distance data, the appearance feature amount extracted by the before-generation extraction module 85 as the feature amount data of the commodity M specified by the specifying module 81 at the distance measured by the distance sensor 15. The CPU 111 selects the recognition dictionary file 30 (31, 32 or 33) in which the registration distance dx is stored as the setting distance (ACT 26). Then the CPU 111 registers the commodity ID and the commodity name of the commodity information record stored in the RAM 113 in the processing in ACT 6 in the recognition dictionary file 30 selected in the processing in ACT 26 in association with the feature amount data extracted in the processing in ACT 25 (ACT 27).

Next, the CPU 111 functions as the acquisition module 87. The acquisition module 87 acquires the appearance shape of the commodity M photographed by the image capturing section 14. The CPU 111 determines whether the shape of the commodity M is sphere, ellipsoid or cylinder, and the size thereof is small, medium or large according to the entire shape of the commodity M recognized in the processing in ACT 12, for example, with a template matching image processing method (ACT 28).

Next, the CPU 111 sets the setting distance, which is next shortest to the current registration distance dx, within the setting distances set in the recognition dictionary file 30 as a new registration distance dy (ACT 29). Then the CPU 111 functions as the generation module 88. The generation module 88 generates a quasi-commodity-image at the time of imaginarily moving the commodity away from the image capturing section 14 to a given registration distance longer than the distance measured by the distance sensor 15 based on the image of the commodity photographed by the image capturing section 14. The CPU 111 calculates the difference between the new registration distance dy and the registration distance dx. Then the CPU 111 reduces the commodity image cut out in the processing in ACT 24 at a reduction ratio equivalent to the difference (ACT 30). The image may be reduced with a well-known method such as a nearest neighbor method, a bilinear method, a bi-cubic method and the like.

Next, the CPU 111 functions as the correction module 89. The correction module 89 corrects the quasi-commodity-image generated by the generation module 88 with a correction coefficient for the registration distance dy. The CPU 111 selects, from the correction files 50, the correction file 50 in which the shape and the size of the commodity M determined in the processing in ACT 28 are stored (ACT 31). The CPU 111 reads each correction coefficient kij of the cell codes S1~Sz corresponding to the registration distance dy from the correction file 50 selected. Then the CPU 111 applies each correction coefficient kij of the cell codes S1~Sz to the part of the same cell of the frame image in which the commodity image is reduced in the processing in ACT 30, to correct the luminance of the reduced commodity image (ACT 32).

After the correction is made, the CPU 111 functions as the after-generation extraction module 90. The after-generation extraction module 90 extracts the appearance feature amount of the commodity from the quasi-commodity-image generated by the generation module 88. The CPU 111 cuts out the reduced commodity image from the frame image corrected in the processing in ACT 32 (ACT 33). Then the CPU 111 extracts the appearance feature amount such as the shape, surface hue, pattern, concave-convex state and the like of the commodity M from the commodity image (ACT 34).

After the appearance feature amount of the commodity M is extracted, the CPU 111 functions as the after-generation registration module 91. The after-generation registration module 91 registers, in the recognition dictionary file 30 in association with the registration distance data, the appearance feature amount extracted by the after-generation extraction module 90 as the feature amount data of the commodity specified by the specifying module 81 at the registration distance dy. The CPU 111 selects the recognition dictionary file, in which the registration distance dy is stored as the setting distance (ACT 35), within the recognition dictionary files 30 (31, 32 or 33). Then the CPU 111 registers the commodity ID and the commodity name of the commodity information record stored in the RAM 113 in the processing in ACT 6 in the recognition dictionary file 30 selected in the processing in ACT 35 in association with the feature amount data extracted in the processing in ACT 34 (ACT 36).

After that, the CPU 111 confirms whether or not the registration distance dy is the maximum value of the setting distance (ACT 37). If the registration distance dy is not the maximum value of the setting distance (NO in ACT 37), the CPU 111 returns to carry out the processing in ACT 29. Then, after setting the setting distance, which is next shortest to the current registration distance, within the setting distances set in the recognition dictionary file 30 as a new registration distance dy, the CPU 111 executes the processing following ACT 30 again.

If the registration distance dy is the maximum value of the setting distance, the processing in ACT 1 is carried out. In this way, since the unregistered commodity list is updated, the user selects a next registration target commodity M. Then the user touches the commodity name and holds the commodity M to the reading window 1B. In this way, each processing in ACT 6~ACT 37 is executed again in the scanner device 1.

If the creation of the recognition dictionary file 30 is completed, the user touches the "end" button. If the "end" button is touched (YES in ACT 5), the CPU 111 erases the unregistered commodity list, and then the operations acting as the recognition dictionary creation apparatus is terminated.

In a case of registering the recognition dictionary record of the commodity M in the recognition dictionary file 30 through the scanner device 1 described in the present embodiment, the user first selects a recognition dictionary creation mode as an operation mode of the scanner device 1. The unregistered commodity list is displayed on the touch panel 12, and then the user selects the commodity M from the list. Next, the registration screen is displayed on the touch panel 12, and the user holds the commodity M to the reading window 1B.

In the scanner device 1, the distance d from the reading window 1B to the commodity M is measured by the distance sensor 15. At this time, since the setting distance d1 (for example, 5 cm) of the short-distance recognition dictionary file 31 is set as the registration distance dx, it is determined whether or not the distance d is consistent with the registration distance dx in the scanner device 1. If the distance d is shorter than the registration distance dx, the difference Δd to the registration distance dx is notified in the scanner device 1. Thus, the user moves the commodity N away from the reading window 1B by a distance equivalent to the difference Δd.

Then, if the distance d from the reading window 1B to the commodity M is consistent with the registration distance dx, a message indicating that the distance d reaches the registration distance dx is notified in the scanner device 1. If the automatic registration mode is set, the image of the commodity M is cutout from the frame image captured by the image capturing section 14, and the appearance feature amount such as the shape, surface hue, pattern, concave-convex state and the like of the commodity M is extracted from the image of the commodity M in the scanner device 1. Then, the feature amount data representing the extracted appearance feature amount in the form of parameters as well as the commodity ID and the commodity name of the commodity M is registered in the short-distance recognition dictionary file 31 in which the setting distance d1 is set.

On the other hand, if the manual registration mode is set, instead of the automatic registration mode, the user operates the registration key. In the scanner device 1, the image of the commodity M is cut out from the image captured by the image capturing section 14, and the appearance feature amount such as the shape, surface hue, pattern, concave-convex state and the like of the commodity M is extracted from the image of the commodity M. Then, the feature amount data representing the extracted appearance feature amount in the form of parameters as well as the commodity ID and the commodity name of the commodity M is registered in the short-distance recognition dictionary file 31 in which the setting distance d1 is set.

When the recognition dictionary record containing the feature amount data of the commodity M is registered in the short-distance recognition dictionary file 31, the shape and the size of the commodity M are acquired from the image of the commodity M in the scanner device 1. Further, in the scanner device 1, the setting distance d2 of the intermediate-distance recognition dictionary file 32 is set as the new registration distance dy. Then the image of the commodity M is reduced at a reduction ratio equivalent to the difference [d2-d1] between the distance d2 and the distance d1.

Further, in the scanner device 1, the correction file 50 corresponding to the shape and the size of the commodity M is selected. For example, if it is assumed that the shape of the commodity M is ellipsoid and the size thereof is medium, the medium-size ellipsoid correction file 55 is selected.

If the correction file 50 is selected, the correction coefficients k21~k2z of each cell code corresponding to the setting distance d2 are selected from the correction file 50 in the scanner device 1. Then, the frame image in which the image of the commodity M is reduced at the reduction ratio equivalent to the difference [d2-d1] is corrected with the correction coefficients k21~k2z for each cell.

In the scanner device 1, the reduced image of the commodity M (quasi-commodity-image) is cut out from the corrected frame image, and the appearance feature amount such as the shape, surface hue, pattern, concave-convex state and the like of the commodity M is extracted from the commodity image. Then, the feature amount data representing the extracted appearance feature amount in the form of parameters as well as the commodity ID and the commodity name of the commodity M is registered in the intermediate-distance recognition dictionary file 32 in which the setting distance d2 is set.

Next, in the scanner device 1, the setting distance d3 of the long-distance recognition dictionary file 33 is set as the new registration distance dy. Then the image of the commodity M is reduced at a reduction ratio equivalent to the difference [d3-d1] between the distance d3 and the distance d1.

Further, in the scanner device 1, the correction coefficients k31~k3z of each cell code corresponding to the setting distance d3 are selected from the correction file 50 corresponding to the shape and the size of the commodity M. Then, the frame image in which the image of the commodity M is reduced at the reduction ratio equivalent to the difference [d3-d1] is corrected with the correction coefficients k31~k3z for each cell.

In the scanner device 1, the reduced image of the commodity M (quasi-commodity-image) is cut out from the corrected frame image, and the appearance feature amount such as the shape, surface hue, pattern, concave-convex state and the like, of the commodity M is extracted from the commodity image. Then, the feature amount data representing the extracted appearance feature amount in the form of parameters as well as the commodity ID and the commodity name of the commodity M is registered in the long-distance recognition dictionary file 33 in which the setting distance d3 is set.

In this way, the recognition dictionary record containing the feature amount data of the commodity M is registered in the short-distance recognition dictionary file 31, the intermediate-distance recognition dictionary file 32 and the long-distance recognition dictionary file 33, respectively. In this case, the feature amount data registered in the short-distance recognition dictionary file 31 is obtained from the image captured in a state in which the commodity M is held apart from the image capturing section 14 by the setting distance d1. Further, the feature amount data registered in the intermediate-distance recognition dictionary file 32 is obtained from the image (quasi-commodity-image) approximate or equivalent to the image captured in a state in which the commodity M is held apart from the image capturing section 14 by the setting distance d2. Similarly, the feature amount data registered in the long-distance recognition dictionary file 33 is obtained from the image (quasi-commodity-image) approximate or equivalent to the image captured in a state in which the commodity M is held apart from the image capturing section 14 by the setting distance d3.

In accordance with the present embodiment, the user is required only to hold the commodity M apart from the image capturing section 14 by the setting distance d1, and the feature amount data obtained from not only the image captured at the setting distance d1 but also the images virtually captured at the setting distance d2 and the setting distance d3 longer than the setting distance d1 are respectively registered in the recognition dictionary file 30 (31, 32, 33). There is no need to capture a plurality of reference images having different resolutions for one commodity to create distance-classified recognition dictionary files 30. Therefore, the distance-classified recognition dictionary files 30 can be created easily and efficiently.

The present invention is not limited to the embodiment described above.

For example, in the embodiment described above, the recognition dictionary file 30 is divided into three types thereof, i.e., the short-distance recognition dictionary file 31, the intermediate-distance recognition dictionary file 32 and the long-distance recognition dictionary file 33. However, the number of the types of the recognition dictionary file 30 is not limited to three. The recognition dictionary file 30 may be divided into two types thereof, i.e., short distance and long distance recognition dictionary files, or more than four types thereof provided that the setting distance in each file of the types is different from one another.

In addition, the recognition dictionary file 30 is not limited to be divided according to different distances. For example, the recognition dictionary file 30 may be physically constituted by one file by adding the data of the setting distances d1~d3 to the recognition dictionary data.

In the embodiment described above, the correction file 50 is divided into nine types, i.e., the small-size sphere correction file 51, the medium-size sphere correction file 52, the large-size sphere correction file 53, the small-size ellipsoid correction file 54, the medium-size ellipsoid correction file 55, the large-size ellipsoid correction file 56, the small-size cylinder correction file 57, the medium-size cylinder correction file 58 and the large-size cylinder correction file 59. However, the number of the types of the correction file 50 is not limited to nine. The correction file 50 may be properly set in accordance with the number of the classifications distinguishing the appearance shapes of the commodity and the classifications distinguishing the sizes of the commodity. Further, the correction file 50 may be constituted by one data file by adding a shape code and a size code to the record including the setting distance and, the correction coefficient for each cell code.

In the embodiment described above, the value equivalent to the amount of the reflected light of the frame image 62 and the value equivalent to the amount of the reflected light of the frame image 63 are set as the correction coefficient kij in a case in which the amount of the reflected light of the frame image 61 is normalized to "1". However, the correction coefficient kij is not limited to this. The correction coefficient kij may be a parameter for representing the attenuation trend of the light reflected by the surface of the object 60 having a standard figure when photographing the object at each separation distance from the image capturing section 14.

In addition, in a case in which the illumination light source attached in the image capturing section 14 is a surface emission type, the correction based on the correction coefficient kij is not needed. In this case, the correction file 50 can be omitted. Further, the processing in ACT 31 and ACT 32 in the procedure of the information processing executed by the CPU 111 of the scanner device 1 according to the recognition dictionary creation program can be omitted as well.

In the embodiment descried above, it is exemplified that the function as a recognition dictionary creation apparatus is included in the scanner device 1 functioning as the commodity recognition apparatus. However, the scanner device 1 does not necessarily include the function as the commodity recognition apparatus. The recognition dictionary creation apparatus may be constituted as a dedicated device. In this case, the recognition dictionary file 30, the commodity information file 40 and the correction file 50 may be stored in an auxiliary storage section arranged in the dedicated device, or in the storage device of a server connected with the dedicated device through a network.

Further, the transfer of the recognition dictionary creation apparatus is generally carried out in a state where the programs such as the recognition dictionary creation program are stored in the ROM. However, the preset invention is not limited to this. The recognition dictionary creation program and the like transferred separately from a computer device may be written in a writable storage device of the computer device through an operation of a user and the like. The transfer of the recognition dictionary creation program and the like may be carried out by recording the program in a removable recording medium, or through a communication via a network. The form of the recording medium is not limited as long as the recording medium can store programs like a CD-ROM, a memory card and the like, and is readable by an apparatus. Further, the function realized by an installed or downloaded program can also be realized through the cooperation with an OS (Operating System) installed in the apparatus.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A recognition dictionary creation apparatus, comprising:
    an image capturing section configured to photograph a commodity to capture the image of the commodity;
    a measurement module configured to measure a distance from the image capturing section to the commodity photographed by the image capturing section;
    a specifying module configured to specify the commodity;
    a storage module configured to store a correction coefficient for representing an attenuation trend of light reflected by a surface of the commodity having a standard figure when photographing the commodity at each separation distance from the image capturing section;
    a generation module configured to generate a quasi-commodity-image in a state in which the commodity is imaginarily moved away from the image capturing section to a given registration distance longer than the distance measured by the measurement module based on the image of the commodity photographed by the image capturing section;
    a correction module configured to correct the quasi-commodity-image generated by the generation module with the correction coefficient for the registration distance;
    an after-generation extraction module configured to extract an appearance feature amount of the commodity from the quasi-commodity-image generated by the generation module, wherein the after-generation extraction module extracts the appearance feature amount of the commodity from the quasi-commodity-image corrected by the correction module; and
    an after-generation registration module configured to register, in a recognition dictionary in association with the registration distance, the appearance feature amount extracted by the after-generation extraction module as the feature amount data of the commodity specified by the specifying module at the registration distance.

2. The recognition dictionary creation apparatus according to claim 1, further comprising:
    an acquisition module configured to acquire the appearance shape of the commodity photographed by the image capturing section; wherein
    the storage module stores, for each standard figure, a correction coefficient for representing the attenuation trend of each light reflected by the surfaces of objects having different standard figures when photographing the objects at each separation distance from the image capturing section, and
    the correction module corrects the quasi-commodity-image with a correction coefficient of a standard figure similar to the appearance shape acquired by the acquisition module.

3. The recognition dictionary creation apparatus according to claim 1, further comprising:
    a before-generation extraction module configured to extract an appearance feature amount of the commodity from the image of the commodity photographed by the image capturing section; and
    a before-generation registration module configured to register the appearance feature amount extracted by the before-generation extraction module as the feature amount data of the commodity specified by the specifying module at the distance measured by the measurement module in the recognition dictionary in association with the distance data.

4. The recognition dictionary creation apparatus according to claim 1, further comprising:
    a determination module configured to determine whether or not the entire shape of the commodity is imaged in the image captured by the image capturing section; and
    a warning module configured to issue a warning if the entire shape of the commodity is not completely imaged.

5. A method for creating a recognition dictionary by a recognition dictionary creation apparatus having an image capturing section, including:
    photographing a commodity by the image capturing section to capture the image of the commodity;
    measuring a distance from the commodity to the image capturing section;
    specifying the commodity;
    storing a correction coefficient for representing an attenuation trend of light reflected by a surface of the commodity having a standard figure when photographing the commodity at each separation distance from the image capturing section;

generating a quasi-commodity-image in a state in which the commodity is imaginarily moved away from the image capturing section to a given registration distance longer than the measured distance based on the image of the commodity photographed by the image capturing section;

correcting the generated quasi-commodity-image with the correction coefficient for the registration distance;

extracting an appearance feature amount of the commodity from the corrected quasi-commodity-image; and registering, in a recognition dictionary in association with the registration distance, the extracted appearance feature amount as the feature amount data of the specified commodity at the registration distance to create the recognition dictionary.

* * * * *